(12) United States Patent
Choi

(10) Patent No.: US 7,907,216 B2
(45) Date of Patent: Mar. 15, 2011

(54) DISPLAY APPARATUS AND CONTROL METHOD THEREOF TO SELECTIVELY DECREASE A PROCESSING TIME OF AN IMAGE SIGNAL

(75) Inventor: Young-hun Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1364 days.

(21) Appl. No.: 11/406,340

(22) Filed: Apr. 19, 2006

(65) Prior Publication Data

US 2006/0268175 A1    Nov. 30, 2006

(30) Foreign Application Priority Data

May 27, 2005    (KR) .................. 10-2005-0045176

(51) Int. Cl.
*H04N 5/21* (2006.01)
(52) U.S. Cl. ........ 348/627; 348/518; 348/512; 348/515; 348/663; 348/448
(58) Field of Classification Search .................. 348/725, 348/706, 441, 448, 515, 512, 518, 663, 665, 348/667, 669, 627; 382/266, 275
See application file for complete search history.

(56) References Cited

U.S. PATENT DOCUMENTS

| | | | | |
|---|---|---|---|---|
| 6,441,658 | B1 * | 8/2002 | Taraci et al. ............... | 327/147 |
| 7,227,587 | B2 * | 6/2007 | MacInnis et al. ........... | 348/667 |
| 7,274,408 | B2 * | 9/2007 | Shan et al. .................. | 348/669 |
| 2002/0126703 | A1 | 9/2002 | Kovacevic | |
| 2002/0180883 | A1 | 12/2002 | Tomizawa et al. | |
| 2005/0266924 | A1 * | 12/2005 | Horikoshi ................... | 463/40 |
| 2006/0132657 | A1 | 6/2006 | Lee et al. | |
| 2008/0211963 | A1 | 9/2008 | Vanderheijden et al. | |

FOREIGN PATENT DOCUMENTS

| | | |
|---|---|---|
| CN | 1477869 A | 2/2004 |
| EP | 1675382 A2 | 6/2006 |
| JP | 4-77074 A | 3/1992 |
| JP | 6-237438 A | 8/1994 |
| JP | 8102911 A | 4/1996 |
| JP | 2003-18500 A | 1/2003 |
| JP | 2005-338605 A | 12/2005 |
| JP | 2008-543149 A | 11/2008 |
| JP | 4350085 B2 | 10/2009 |
| KR | 96-36716 A | 10/1996 |
| KR | 10-2001-0020520 A | 3/2001 |
| WO | 2006126113 A2 | 11/2006 |

OTHER PUBLICATIONS

Japanese Office Communication dated Nov. 4, 2009 issued in counterpart application No. 2006-142701.
Internet Message Board, [http://forum.ecoustics.com/bbs/messages/2/199113.html] May 22, 2005-Aug. 30, 2005. 56 pages.
Office Action dated Jul. 13, 2010 from the Japanese Patent Office in counterpart application JP 2006-142701.

* cited by examiner

*Primary Examiner* — Jefferey F Harold
*Assistant Examiner* — Jean W Désir
(74) *Attorney, Agent, or Firm* — Sughrue Mion, PLLC

(57) ABSTRACT

A display apparatus including an image receiver receiving an image signal and a display displaying the image signal. The display apparatus includes a user selector, an image signal processor to process at least one image delay decrease mode to decrease a processing time of the image signal and a controller to control the image signal processor to process the image signal according to the selected image delay decrease mode if an image delay decrease mode is selected through the user selector.

18 Claims, 3 Drawing Sheets

DISPLAY APPARATUS AND CONTROL METHOD THEREOF TO SELECTIVELY DECREASE A PROCESSING TIME OF AN IMAGE SIGNAL

CROSS-REFERENCE TO RELATED APPLICATIONS

This application claims the benefit of Korean Patent Application No. 2005-0045176, filed on May 27, 2005, in the Korean Intellectual Property Office, the disclosure of which is incorporated herein by reference.

BACKGROUND OF THE INVENTION

1. Field of the Invention

The present invention relates to a display apparatus and a control method thereof, and more particularly, to a display apparatus and a control method thereof decreasing an image delay in processing an image signal.

2. Description of the Related Art

Recently, a premium display apparatus to support a progressive image output has been introduced. The display apparatus generally processes a signal by a frame unit as it has been changed from an analog to a digital signal in processing. In this case, a signal processing IC using a frame memory is commonly used.

There are a 3D-comb, a decoder, a de-interlacer, a scaler, and an image enhancer in the signal processing IC. The signal processing IC not only processes basic signals but it also compares data with frames in front and behind, thereby processing image data and signals to enhance an image quality.

The display apparatus using the abovementioned process for enhancing the image quality maintains an excellent image quality, but generates time delay since it processes a great deal of data internally.

However, if the user watches a screen when a game machine is connected to the display apparatus, the time delay is generated, resulting in the input not being synchronized with the output. That is, motion time in the game machine may not be actually synchronized with response time of the user.

Likewise, a video image does not have a problem caused by a signal delay since there is no interaction with the user, but a game image may have a problem when the user's input is not synchronized with the image signal in the game machine since there is interaction with the user.

SUMMARY OF THE INVENTION

Accordingly, it is an aspect of the present invention to provide a display apparatus and a control method thereof decreasing an image delay, thereby resolving user's inconvenience caused by not synchronizing a user's input with an image signal.

The foregoing and/or other aspects of the present invention are achieved by providing a display apparatus comprising an image receiver receiving an image signal and a display displaying the image signal, comprising a user selector; an image signal processor to process at least one image delay decrease mode decreasing a processing time of the image signal; and a controller controlling the image signal processor to process the image signal according to the selected image delay decrease mode if the image delay decrease mode is selected through the user selector.

According to another aspect of the present invention, the image signal processor comprises an image enhancer to enhance quality of the image signal and the controller omits process of the image enhancer according to the image delay decrease mode.

According to another aspect of the present invention, the image signal processor comprises a de-interlacer and the controller controls the de-interlacer to operate by an intrafield process according to the image delay decrease mode.

According to another aspect of the present invention, the image signal processor comprises a Y/C separator and the controller controls the Y/C separator to operates by a 2D Y/C process according to the image delay decrease mode.

According to another aspect of the present invention, the image signal processor comprises a Y/C separator, a video decoder, a de-interlacer, a scaler, and an image enhancer and the controller controls the Y/C separator to operate by a 2D Y/C separation, the de-interlacer to operate by an intrafield process, and the image enhancer to be omitted to process when a first image delay decrease mode is selected.

According to another aspect of the present invention, the controller controls the Y/C separator to operate by a 2D Y/C separation, the de-interlacer to operate by the interfield process, and the image enhancer to be omitted to process when a second image delay decrease mode is selected.

According to another aspect of the present invention, the controller controls the Y/C separator to operate by the 3D Adaptive Y/C separation, the de-interlacer to operate by an interfield process, and the image enhancer to be omitted to process when a third image delay decrease mode is selected.

According to another aspect of the present invention, the display apparatus further comprises a UI generator generating a selective menu about at least one image delay decrease mode, wherein the controller controls the UI generator to generate the selective menu when an image delay decrease function is selected through the user selector.

According to another aspect of the present invention, the display apparatus further comprises an audio processor processing an audio signal, wherein the controller sets up signal process time of the audio processor according to the selected image delay decrease mode.

The foregoing and/or other aspects of the present invention are also achieved by providing a control method of a display apparatus comprising an image receiver receiving an image signal and an image signal processor processing the image signal, comprising generating a selective menu about at least one image delay decrease mode; and processing the image signal according to an image delay decrease mode selected through the selective menu.

According to another aspect of the present invention, the processing the image signal comprises processing the image signal to be separated by a 2D Y/C separation, to be de-interlaced by an intrafield process, and to be omitted in an image enhancing process when a first image delay decrease mode is selected.

According to another aspect of the present invention, the processing the image signal comprises processing the image signal to be separated by a 2D Y/C separation, to be de-interlaced by the interfield process, and to be omitted in an image enhancing process when a second image delay decrease mode is selected.

According to another aspect of the present invention, the processing the image signal comprises processing the image signal to be separated by the 3D Adaptive Y/C separation, to be de-interlaced by an interfield process, and to be omitted in an image enhancing process when a third image delay decrease mode is selected.

According to another aspect of the present invention, the control method of the display apparatus further comprises setting up processing time of an audio signal according to the selected image delay decrease mode.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

Figure 1:
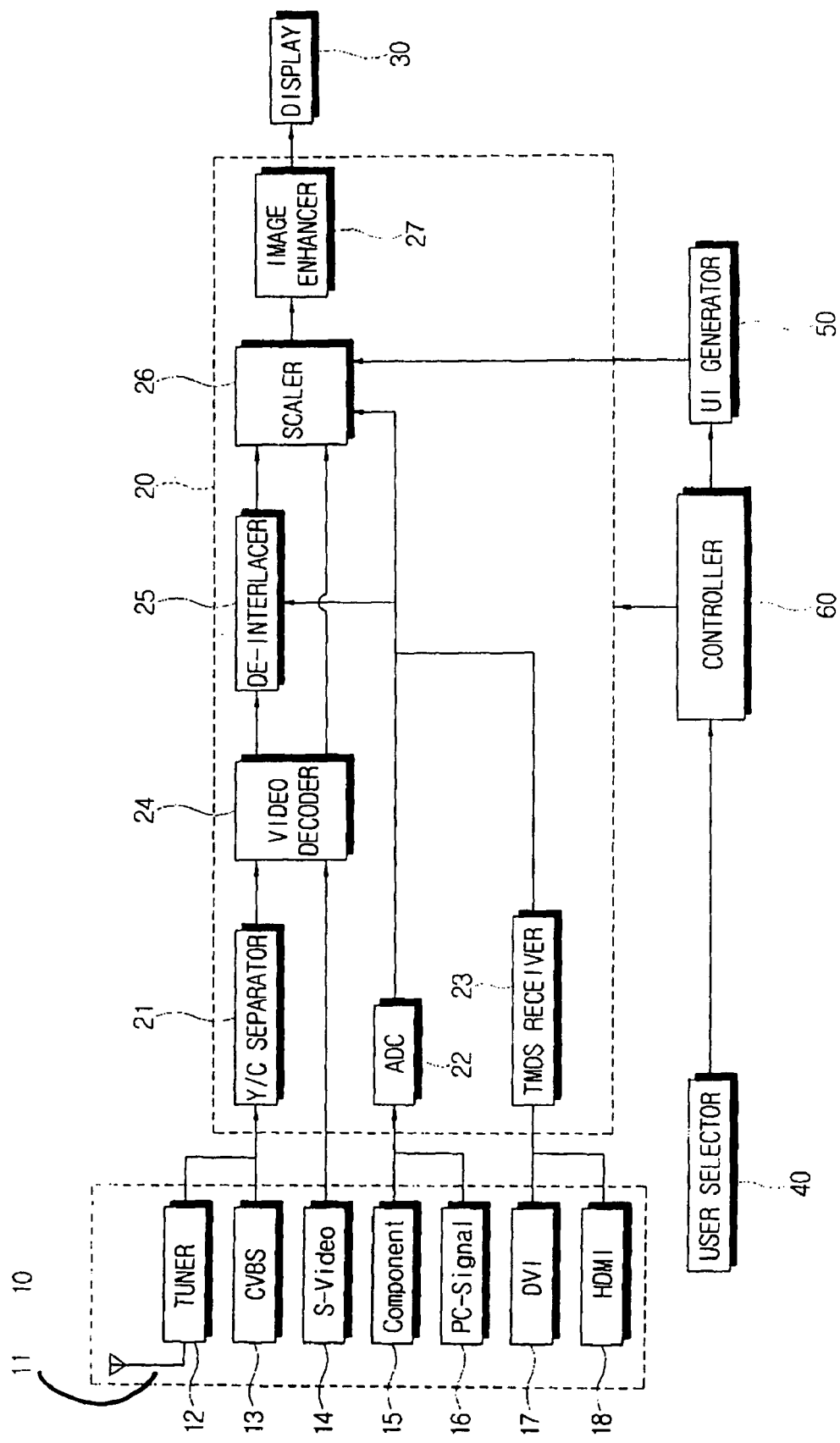
FIG. 1 is a control block diagram of a TV according to an exemplary embodiment of the present invention.

DETAILED DESCRIPTION OF THE ILLUSTRATIVE, NON-LIMITING EMBODIMENTS OF THE INVENTION

Reference will now be made in detail to exemplary embodiments of the present invention, examples of which are illustrated in the accompanying drawings, wherein like reference numerals refer to like elements throughout. The exemplary embodiments are described below in order to explain the present invention by referring to the figures and are not intended to limit the scope of the invention in any way.

FIG. 1 is a control block diagram of a TV according to an exemplary embodiment of the present invention. As shown in FIG. 1, the TV according to the exemplary embodiment of the present invention comprises an image receiver 10, an image signal processor 20, a display 30, a user selector 40, a UI generator 50 and a controller 60.

The image receiver 10 comprises an antenna 11 receiving a broadcasting signal and a tuner 12 tuning a broadcasting signal of a specific channel that a user selects by the controller 60 (mentioned later). Further, the image receiver 10 may comprise an input terminal receiving an image signal corresponding to various external sources, such as CVBS (Composite Video Baseband Signal) 13, S-video 14, Component 15, PC-signal 16, DVI (Digital Video/Visual Interactive) 17, HDMI (High-Definition Multimedia Interface) 18.

The image signal processor 20 converts a signal inputted through the image receiver 10 to a signal in a format the display 30 may process. As shown in FIG. 1, the image processor 20 according to the exemplary embodiment of the present invention comprises a signal processing IC such as an Y/C separator (luminance (Y) and chrominance (C) separator) 21, an ADC (analog to digital converter) 22, a TMDS (transition minimized differential signaling) receiver 23, a video decoder 24, a de-interlacer 25, an image enhancer 27.

The Y/C separator 21 separates the broadcasting signal and the CVBS inputted by luminance and chrominance being mixed into luminance (Y) and chrominance (C). The Y/C separator 21 may comprise a 3D-comb filter, which may separate the signal with various filtering methods. For example, the filtering methods may include Low pass filtering, High pass filtering, notch filtering, 2D Y/C separation, 3D Y/C separation, and 3D Adaptive separation.

Here, the 2D Y/C separation separates chrominance based on the data in a frame using the 2,3,4-line comb filtering. The 3D Y/C separation separates luminance and chrominance between the lines within a frame, and between the same pixel data from the frames in front and behind as well. The 3D Y/C separation may realize a high image quality, but need a frame memory to perform and generates an image signal delay in a frame.

The 3D Adaptive separation processes signals with close to the 2D Y/C separation where there is lots of motion and the 3D Y/C separation where there is little motion. The 3D Adaptive separation generates the image signal delay like the 3D Y/C separation. When the image delay decrease mode is selected, the Y/C separator operates by the 2D Y/C separation, thereby minimizing the image delay.

The image signal processor 20 according to the exemplary embodiment of the present invention comprises the ADC 22 converting an analog signal of a component signal or a PC-signal into a digital signal and the TMDS receiver 23 separating a DVI-signal into a R,G,B digital signal and an H/V signal. The image signal outputted from the ADC 22 or the TMDS receiver 23 is inputted to the de-interlacer 25 or the scaler 26 (mentioned later) and is processed.

The video decoder 24 decodes the inputted image signal; determines a color system; separates U, V from the chrominance C; and outputs the inputted image signal into Y, U, V.

The de-interlacer 25 converts the inputted image signal from an interlacing format to a progressive format. Mainly, a broadcasting signal, CVBS, and an S-video signal correspond to an interlacing signal. The interlacing signal, among the signals inputted through another input terminal, is converted into the progressive signal by the de-interlacer.

The de-interlacer 25 according to the present invention processes the image signal by a 2D process of an intrafield process or by a 3D process of an interfield process. Here, the intrafield process comprises a line doubling process copying data in each line and interpolating them, and a line interpolation process referring to data in plurality lines and interpolating them.

Furthermore, the interfield process comprises a field merging process interposing an even or an odd field to form a frame, a motion-adaptive process processing the image signal by the 3D process used where there is little motion and by the 2D process used where there is lots of motion, and a motion-compensated process calculating to process a motion vector between successive fields by sampling.

Here, since in the interfield process the data from the frames in front and behind should be compared, the image delay is generated. Accordingly, if the image delay decrease mode is selected, the de-interlacer operates by the intrafield process, which decreases the image delay.

The scaler 26 converts the inputted image signal to be suitable for an output standard of the display 30 in vertical frequency, resolution, ratio of a screen, and etc.

The image enhancer 27 performs contrast enhance, black & white stretch, or the like to enhance quality of the image signal outputted through the scaler 26, thereby delaying the image signal processing. Therefore, if the image delay decrease mode is selected, the process of the image enhancer 27 may be omitted, thereby to decrease the image delay.

The display 30 is inputted with the image signal from the image signal processor 20 and displays it on the screen. The display 30 comprises a display panel on which an image is displayed and a panel driving part. The display panel may comprise an LCD (Liquid Crystal Display), a PDP (Plasma Display Panel), or the like.

The user selector 40 outputs a key signal to the controller 60 (mentioned later) according to the user's operation. The user selector 40 may comprise a menu key to select the image delay decrease function, a handling key for up, down, left or right to indicate or select each UI item displayed on the screen, and a key signal generator generating the key signal according to handling keys. Further, the user selector 40 may be other or additional input means such as a mouse, a keyboard, or a wireless remote controller as well.

The UI generator 50 generates a selective menu about the image delay decrease mode according to control by the controller 60. The selective menu generated by the UI generator 50 comprises at least one image delay decrease mode.

Moreover, the UI generator 50 may display an image delay decrease degree according to each item by an icon or a text data so that the user easily recognizes it. Therefore, the user may obtain information on the image delay decrease mode through the icon or the text data displayed on the display 30. Also, there may be a naming or ordering method according to the image delay decrease degree.

Here, the image delay decrease mode may exist in plural. A plurality of the image delay decrease modes may be made and varies in the image delay decrease degree according whether the Y/C separator 21 and the de-interlacer 25, in which the image delay is generated, operate by the 2D process and whether the image enhancer 27 is omitted to process, that is, according to the processing methods of the Y/C separator 21, the de-interlacer 25, and the image enhancer 27.

For example, let us say that the display apparatus according to the present invention operates by three image delay decrease modes, which are a first image delay decrease mode, a second image delay decrease mode, and a third image delay decrease mode.

Provided that the Y/C separator 21 operates by the 2D Y/C separation, the de-interlacer 25 operates by the 2D process, and the image enhancer 27 is omitted to process in the first image delay decrease mode; the Y/C separator 21 operates by the 2D Y/C separation, the de-interlacer 25 operates by the 3D process and the image enhancer 27 is omitted to process in the second image delay decrease mode; and the Y/C separator 21 operates by the 3D Adaptive Y/C separation, the de-interlacer 25 operates by the 3D process and the image enhancer 27 is omitted to process in the third image delay decrease mode, the image delay decrease degree becomes low in order of the first image delay decrease mode, the second image delay decrease mode and the third image delay decrease mode. That is, the image delay decrease degree is maximum in the first image delay decrease mode, medium in the second image delay decrease mode, and minimum in the third image delay decrease mode.

In this case, the UI generator 50 generates the selective menu comprising each item of the image delay decrease mode. It does not need to inform the user of specific process about each mode. However, as aforementioned, the image delay decrease degree may be displayed by the icon or the text data corresponding the maximum, the medium, and the minimum. Specific description thereof will be provided later.

The controller 60 controls the image signal processor 20 to decrease processing delay of the image signal according to the image delay decrease mode selected by the user selector 40. As aforementioned, the image signal processor 20 processes the image signal with various signal processing methods. The controller 60 correspondingly changes a setting value so that the image signal processor 20 operates by a signal processing method to decrease the image delay according to the input signal of the user selector 40. The controller 60 may be realized by a microcomputer and a microcontroller.

Also, the controller 60 may comprise a memory or a register to set up the image delay decrease mode. Here, the memory and the register to set up the mode may be comprised in the image signal processor 20. Operation of the controller 60 will be mentioned later in detail.

The display apparatus according to an exemplary embodiment of the present invention may further comprise an audio signal processor (not shown). The controller 60 controls the audio signal processor to delayedly process an audio signal as much as the corresponding delayed time depending on a delayed degree of the corresponding mode when the image delay mode is selected. Therefore, the image signal delay is synchronized with the audio signal output.

Hereinafter, a control method of the display apparatus according to an exemplary embodiment of the present invention will be described with referring to FIGS. 2 and 3.

Figure 2:
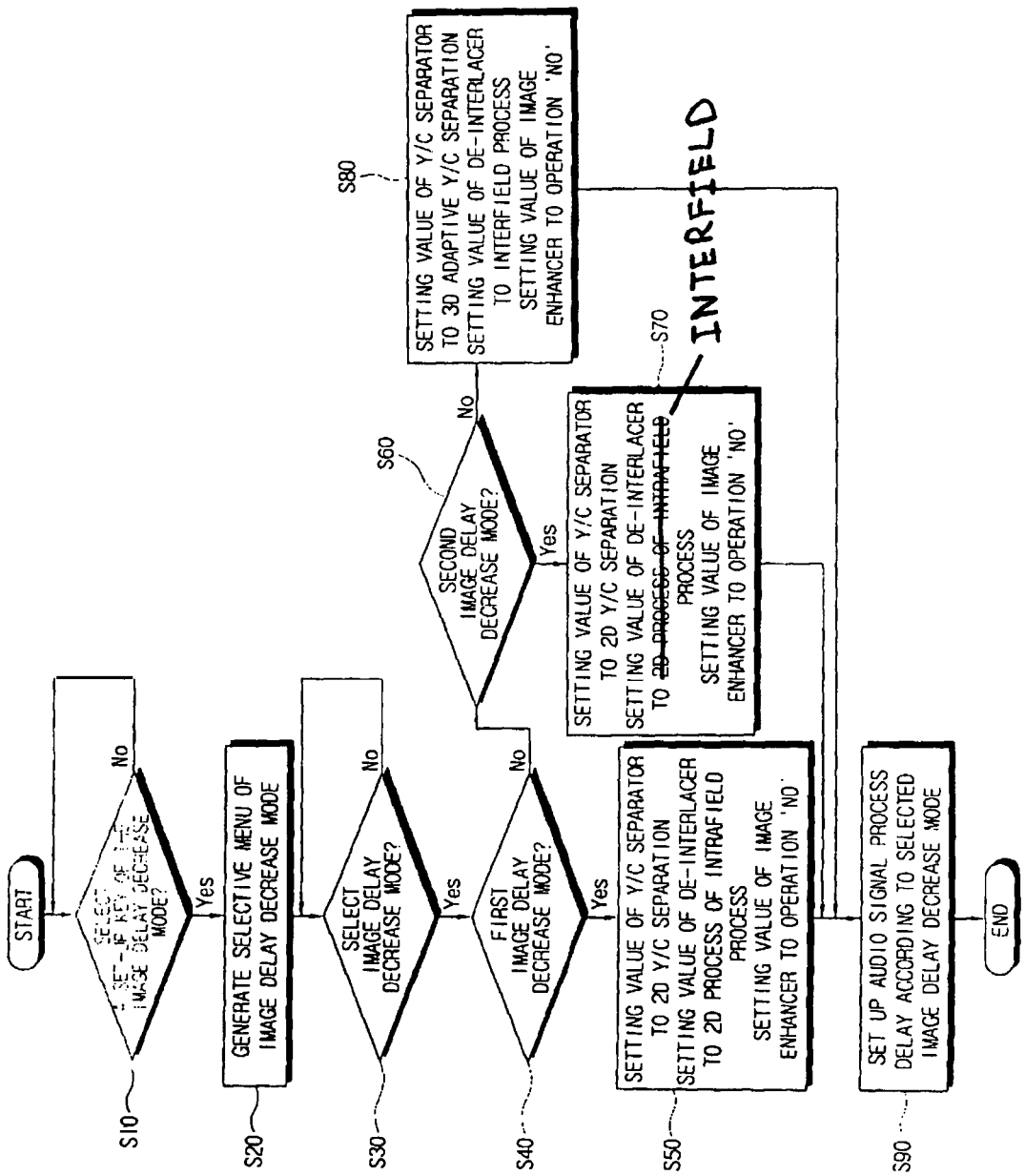
FIG. 2 is a control flow chart of the TV according to the exemplary embodiment of the present invention.

As shown in FIG. 2, if the user adjusts buttons or keys of the user selector 40 and selects a set-up menu of the image delay decrease mode, at operation S10, the key signal generator (not shown) correspondingly generates the key signal and applies it to the controller 60. Accordingly, the controller 60 controls the UI generator 50 to generate the selective menu of the image delay decrease mode corresponding to the key signal inputted from the key signal generator, and to output the selective menu to the scaler 27, and to compound the key signal with the image signal, and then to display it on the display 30, at operation S20.

Figure 3:
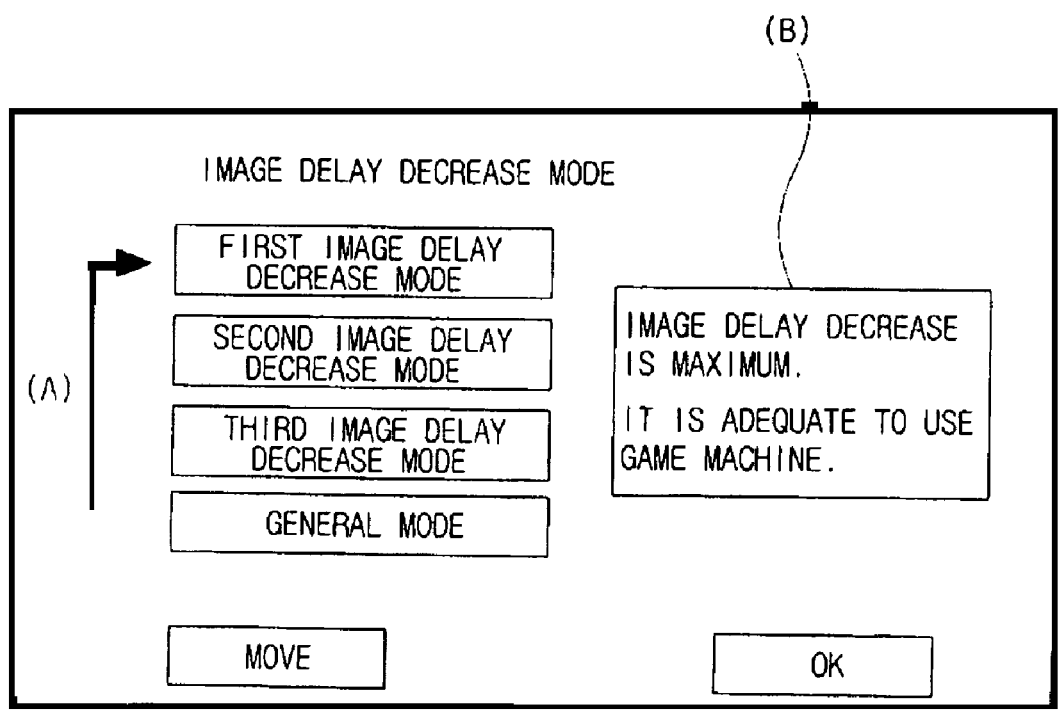
FIG. 3 shows a UI selective menu about an image delay decrease mode of the TV according to the exemplary embodiment of the present invention.

FIG. 3 shows the UI screen about the image delay decrease mode according to an exemplary embodiment of the present invention. The UI selective menu displayed on the screen comprises a plurality of the image delay decrease modes displayed on area 'A'. Here, there are 4 kinds of items in the image delay decrease modes includes a general mode.

If the user indicates or selects one of items through the user selector 40, the UI generator 50 generates a text data or an icon corresponding to the image delay decrease mode indicated or selected on area 'B'.

As shown in FIG. 3, if the a first image delay decrease mode is indicated or selected through the user selector 40, the text data is displayed, saying that "the image delay decrease degree is maximum . . . ", on the area 'B', for example. Therethrough, the user gets corresponding information about the selected image delay decrease mode.

If the user selects the desiring image delay decrease mode by adjusting direction keys or the like of the user selector 40, at operation S30, the controller 60 determines whether the selected image delay decrease mode is the first image delay decrease mode, at operation S40.

If the user selects the first image delay decrease mode through the user selector 40, at operation S40, the controller 60 sets up a setting value of the Y/C separator 21 to the 2D Y/C separation, a setting value of the de-interlacer 25 to the 2D process of the intrafield process, and a setting value of the image enhancer 27 to operation 'No', at operation S50. Therefore, the Y/C separator 21, the de-interlace 25, and the image enhancer 27 operate by the process corresponding to the setting value. The first image delay decrease mode, which is maximized in the image delay among the image delay decrease modes, is efficient when using the external source interacting with the user like a game machine.

If the user selects the second image delay decrease mode through the user selector 40, at operation S60, the controller 60 sets up the setting value of the Y/C separator 21 to the 2D Y/C separation, the setting value of the de-interlacer 25 to the interfield process and the setting value of the image enhancer 27 to the operation 'No', at operation S70. The second image delay decrease mode, which is medium in the image delay among the image delay decrease mode, has superior image quality to the first image delay decrease mode.

If the user selects the third image delay decrease mode through the user selector 40, the controller 60 sets up the setting value of Y/C separator 21 to the 3D Adaptive Y/C separation, the setting value of de-interlacer 25 to the interfield process and the setting value of the image enhancer to the operation 'No', at operation S80. In case that the image delay decrease mode is changed from the first image delay decrease mode or the second image delay decrease mode to the third image delay decrease mode, the controller 60 changes the setting of the Y/C separator to the 3D-Adaptive Y/C separation and the setting of the deinterlacer to the interfield process, at operation S80. The third image delay decrease mode is minimized in the image delay among the image delay decrease modes and is excellent in the image quality.

The user may change the image delay decrease mode to the general mode by selecting the general mode. If the user selects the general mode through the user selector 40, the controller 60 controls the image signal processor 20 to operate not by the image delay decrease mode but by a process enhancing the image quality. That is, the Y/C separator operates by the 3D-Adaptive Y/C separation, the de-interlacer operates by the interfield process, and the image enhancer operates 'On'.

Furthermore, the controller 60 controls the audio signal processor to delay process delay time of the audio signal corresponding to the selected image delay decrease mode, at operation S90. Therefore, the image signal is synchronized with the audio signal.

In the aforementioned embodiment, a TV is described as an example of the display apparatus, but the exemplary embodiment may be adopted to other display apparatuses as well. Also, there are mentioned three kinds of image delay decrease modes in the exemplary embodiment of the present invention, which may vary according to combination of the signal processing method of the signal processing IC.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus including an image receiver receiving an image signal and a display displaying the image signal, comprising:
    a user selector;
    an image signal processor to process at least one image delay decrease mode decreasing a processing time of the image signal; and
    a controller controlling the image signal processor to process the image signal according to a selected image delay decrease mode, of the at least one image delay decrease mode, selected through the user selector,
    wherein the image signal processor comprises an image enhancer to enhance quality of the image signal and the controller omits the processing of the image enhancer according to the selected image delay decrease mode.

2. The display apparatus according to claim 1, wherein the image signal processor comprises a de-interlacer and the controller controls the de-interlacer to operate by an intrafield process according to the image delay decrease mode.

3. The display apparatus according to claim 2, wherein the image signal processor comprises a Y/C separator and the controller controls the Y/C separator to operate by a 2D Y/C process according to the image delay decrease mode.

4. The display apparatus according to claim 1, wherein the image signal processor further comprises a Y/C separator, a video decoder, a de-interlacer, and a scaler, and the controller controls the Y/C separator to operate by a 2D Y/C separation, the de-interlacer to operate by an intrafield process, and the image enhancer to be omitted from the processing when a first image delay decrease mode is selected.

5. The display apparatus according to claim 4, wherein the controller controls the Y/C separator to operate by a 2D Y/C separation, the de-interlacer to operate by the interfield process, and the image enhancer to be omitted from the processing when a second image delay decrease mode is selected.

6. The display apparatus according to claim 5, wherein the controller controls the Y/C separator to operate by the 3D Adaptive Y/C separation, the de-interlacer to operate by an interfield process, and the image enhancer to be omitted from the processing when a third image delay decrease mode is selected.

7. The display apparatus according to claim 6, further comprising a UI generator generating a selective menu about at least one image delay decrease mode, wherein the controller controls the UI generator to generate the selective menu when an image delay decrease function is selected through the user selector.

8. The display apparatus according to claim 6, further comprising an audio processor processing an audio signal, wherein the controller sets up a signal process time of the audio processor according to the selected image delay decrease mode.

9. The display apparatus according to claim 5, further comprising an audio processor processing an audio signal, wherein the controller sets up a signal process time of the audio processor according to the selected image delay decrease mode.

10. A control method of a display apparatus including an image receiver receiving an image signal and an image signal processor processing the image signal, comprising:
    generating a selective menu relating to at least one image delay decrease mode; and
    processing the image signal according to an image delay decrease mode selected from among the at least one image delay decrease mode through the selective menu,
    wherein the processing the image signal comprises processing the image signal to be omitted in an image enhancing process according to the selected image delay decrease mode.

11. The control method of the display apparatus according to claim 10, wherein the processing the image signal comprises processing the image signal to be separated by a 2D Y/C separation, to be de-interlaced by an intrafield process, and to be omitted in the image enhancing process when a first image delay decrease mode is selected.

12. The control method of the display apparatus according to claim 11, wherein the processing the image signal further comprises processing the image signal to be separated by a 2D Y/C separation, to be de-interlaced by the interfield process, and to be omitted in the image enhancing process when a second image delay decrease mode is selected.

13. The control method of the display apparatus according to claim 12, wherein the processing the image signal further comprises processing the image signal to be separated by a 3D Adaptive Y/C separation, to be de-interlaced by an interfield process, and to be omitted in the image enhancing process when a third image delay decrease mode is selected.

14. The control method of the display apparatus according to claim 10, further comprising setting up processing time of an audio signal according to the selected image delay decrease mode.

15. A display apparatus comprising:
    an image receiver which receives an image signal;
    a display which displays the image signal;

an image signal processor which processes the image signal received by the image receiver and sends the image signal to the display; and a user controller which allows a user to select an image delay decrease mode;

wherein the image signal processor decreases a processing time if the image delay decrease mode is selected, wherein the signal processor comprises an image enhancer which operates to enhance the image signal and the operation of the image enhancer is omitted based upon whether the image delay decrease mode is selected.

16. The display apparatus according to claim 15, wherein the image enhancer operates to enhance the image signal when the image delay decrease mode is not selected and does not operate to enhance the image signal when the image delay decrease mode is selected.

17. A display apparatus comprising:

an image receiver which receives an image signal;

a display which displays the image signal;

an image signal processor which processes the image signal received by the image receiver and sends the image signal to the display; and a user controller which allows a user to select an image delay decrease mode;

wherein the image signal processor decreases a processing time if the image delay decrease mode is selected, wherein the signal processor comprises a de-interlacer which processes the image signal by an intrafield process when the image delay decrease mode is selected and by an interfield process when the image delay decrease mode is not selected.

18. A display apparatus comprising:

an image receiver which receives an image signal;

a display which displays the image signal;

an image signal processor which processes the image signal received by the image receiver and sends the image signal to the display; and a user controller which allows a user to select an image delay decrease mode;

wherein the image signal processor decreases a processing time if the image delay decrease mode is selected, wherein the signal processor comprises a Y/C separator which performs 2D Y/C separation when the image delay decrease mode is selected and performs 3D Y/C separation when the image delay decrease mode is not selected.

* * * * *